United States Patent [19]
Hasegawa et al.

[11] Patent Number: 5,382,782
[45] Date of Patent: Jan. 17, 1995

[54] CIRCUIT FOR ADJUSTING SENSITIVITY OF OPTICAL CHARACTER READER AND METHOD THEREOF

[75] Inventors: Kazuo Hasegawa; Junichi Ouchi, both of Furukawa, Japan

[73] Assignee: Alps Electric Co., Ltd., Tokyo, Japan

[21] Appl. No.: 157,757

[22] Filed: Nov. 24, 1993

[30] Foreign Application Priority Data

Dec. 3, 1992 [JP] Japan .................................. 4-324252

[51] Int. Cl.6 .............................................. G06K 7/10
[52] U.S. Cl. ..................................... 235/455; 235/472
[58] Field of Search ................................ 235/455, 472

[56] References Cited
U.S. PATENT DOCUMENTS

4,528,444 7/1985 Hara et al. .
5,281,801 1/1994 Shepard et al. ................... 235/472

*Primary Examiner*—Harold Pitts
*Attorney, Agent, or Firm*—Guy W. Shoup; Patrick T. Bever

[57] ABSTRACT

A circuit for adjusting the sensitivity of an optical character reader in which light is applied to an information-recorded material by an LED array and the information is read by a line sensor. The optical character reader is switched to a sensitivity adjusting mode. It reads a reference material having uniform reflectivity on the surface. The read signal is A/D converted and the microcomputer 10 detects a discrepancy between the amounts of light depending on the different portions of the line sensor. Based upon the detection, the microcomputer sets the applying time of driving currents to the respective LEDs so that the light is uniformly applied to the reference material. The set value is stored in a memory. Thereafter, since the amounts of light from the LEDs of the LED array are adjusted according to the set value, the amount of the reflected light to the line sensor 5 can be uniform. Thus, a series analog voltage accurately responding to the darkness and brightness of the information can be obtained.

6 Claims, 3 Drawing Sheets

CIRCUIT FOR ADJUSTING SENSITIVITY OF OPTICAL CHARACTER READER AND METHOD THEREOF

BACKGROUND OF THE INVENTION

Field of the Invention

The present invention relates to a circuit for adjusting the sensitivity of an optical character reader for optically reading information, the optical character reader applying light to the information by a light source comprising a plurality of light emitting materials, for example, an LED array comprising a plurality of LEDs. The invention also relates to a method of adjusting the sensitivity of the optical character reader.

Description of the Related Art

Conventionally, a general optical character reader optically reading information is operated such that an LED array (light source) comprising a plurality of LEDs (light emitting materials) applies light to a medium in which information (for example, a bar code) is recorded and a line sensor reads the reflected light from the medium, thereby reading the information. The following is used as a line sensor for the optical character reader: a CCD line sensor comprising a photoelectric conversion section including a plurality of photodiodes; a charge storage section including PN junctions of the respective photodiodes; and a charge transfer section including CCDs (Charge Coupled Devices) the number of which accords with the number of photodiodes. The photoelectric conversion section converts the incident light coming from the outside into electric charges the amount of which accords with the amount of received light. The charge storage section temporarily stores the electric charges obtained in the photoelectric conversion section and feeds them to the charge transfer section at one time by applying a start pulse. The charge transfer section transfers the charges by stages every time a clock pulse is applied so as to transmit them from the line sensor as a chronological series analog signal.

The amplitude of the series analog signal transmitted from the line sensor is obtained in the photoelectric conversion section. It relies on the amount of charges stored in the charge storage section. The amount of charges further relies on the time interval between the application of one start pulse and that of the next start pulse, that is, the storage time.

Although the sensitivity of receiving the reflected light by the line sensor is substantially uniform, the components other than the line sensor have varied characteristics, and more specifically, the luminances of the LEDs forming the LED array vary, thus causing variations in the amounts of light applied to the medium even though the light emitting time is uniform regardless of the LEDs. In the above-mentioned optical character reader, the discrepancy between amounts of reflected light to the line sensor directly causes the discrepancy between amounts of charges. The optical character reader determines the information on the basis of the discrepancy between amounts of charges. Thus, the optical character reader might mistakingly determines the discrepancy between amounts of light due to variations in the luminances of the LEDs as information on the medium.

After the series analog signal is amplified, it is binary-coded. When the amplitude is too large, the series analog signal is saturated while being amplified, thus failing to be accurately binary-coded. On the other hand, when the amplitude is too small, the series analog signal cannot obtain a suitable threshold level when it is binary-coded, thus also failing to be accurately binary-coded.

Hence, in order to accurately execute binary-coded processing on the series analog signal, it is necessary to make the amplitude of the series analog signal substantially constant. In particular, when there are variations in brightness of the LEDs forming the LED array, it is necessary to correct such variations. Conventionally, an LED array is formed by the following method. A plurality of LEDs are first classified into different luminance levels, and the LEDs with the same luminance are used for forming the LED array. However, such a method makes the formation of the LED array extremely complicated.

Also, although the luminance of the LEDs forming the LED array varies due to changes in temperature or lapse of time, a discrepancy between the amounts of light applied to a medium due to the variations in the luminance can no longer be corrected.

SUMMARY OF THE INVENTION

Accordingly, in order to solve the above problems, an object of the present invention is to provide a circuit for adjusting the sensitivity of an optical character reader which is capable of correcting the discrepancy between the amounts of light due to variations in the luminances of the LEDs forming the LED array, and also to provide a method of adjusting the sensitivity of the optical character reader.

In a first aspect of the present invention, a reference material to which sensitivity adjustment is made is read so that variations in the luminances of LEDs forming an LED array are examined. Afterwards, in order to correct such variations, driving currents flowing to the respective LEDs are adjusted.

In a second aspect of the present invention, a reference material to which sensitivity adjustment is made is read so that variations in the luminances of LEDs forming an LED array are examined. Afterwards, in order to correct the discrepancy between the amounts of light due to the variations in the luminances, the applying time of the driving currents to the LEDs is adjusted.

DESCRIPTION OF THE PREFERRED EMBODIMENTS

Figure 1:
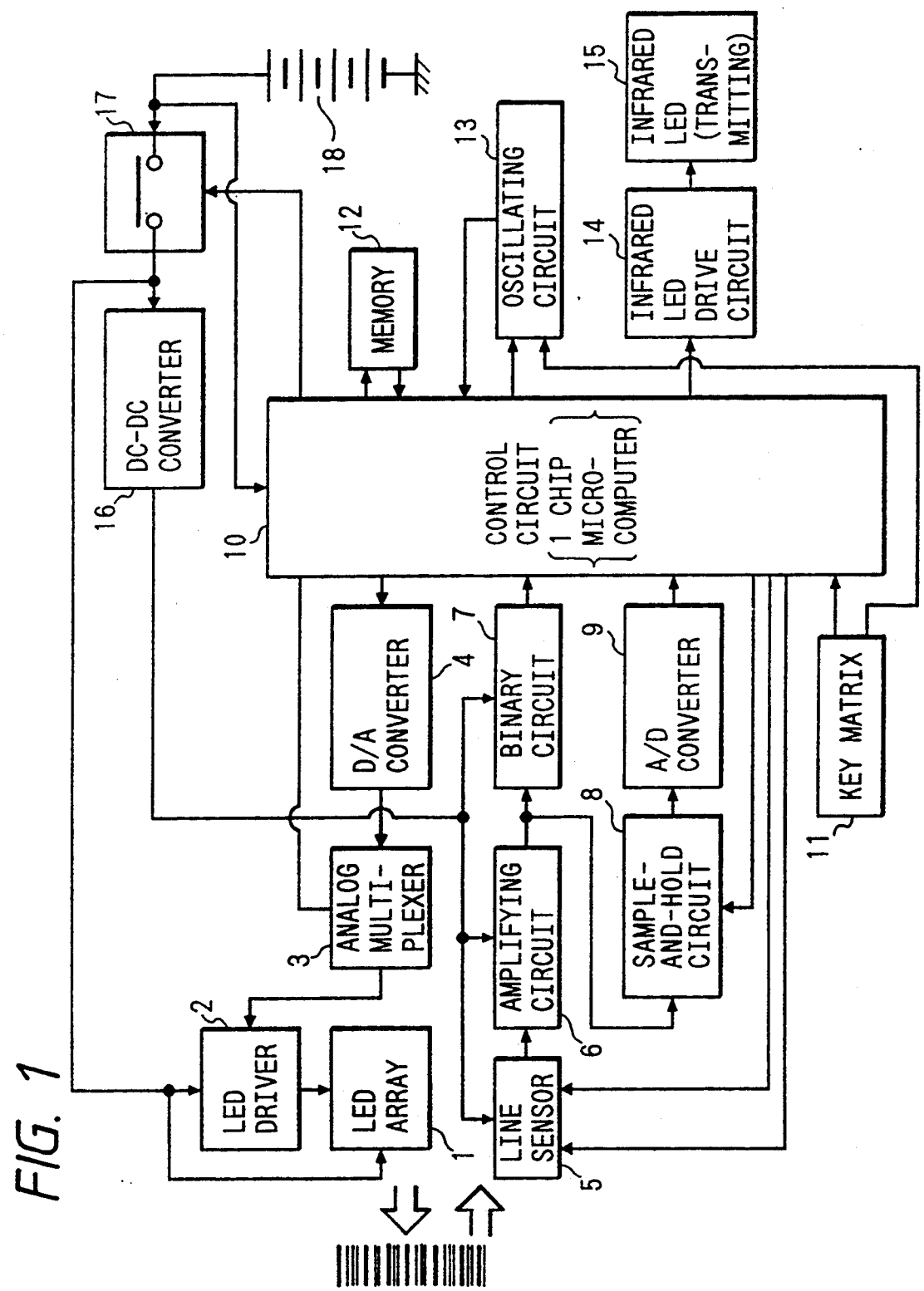
FIG. 1 is a block diagram showing an embodiment of a circuit for adjusting the sensitivity of an optical character reader according to a first aspect of the present invention.
Figure 2:
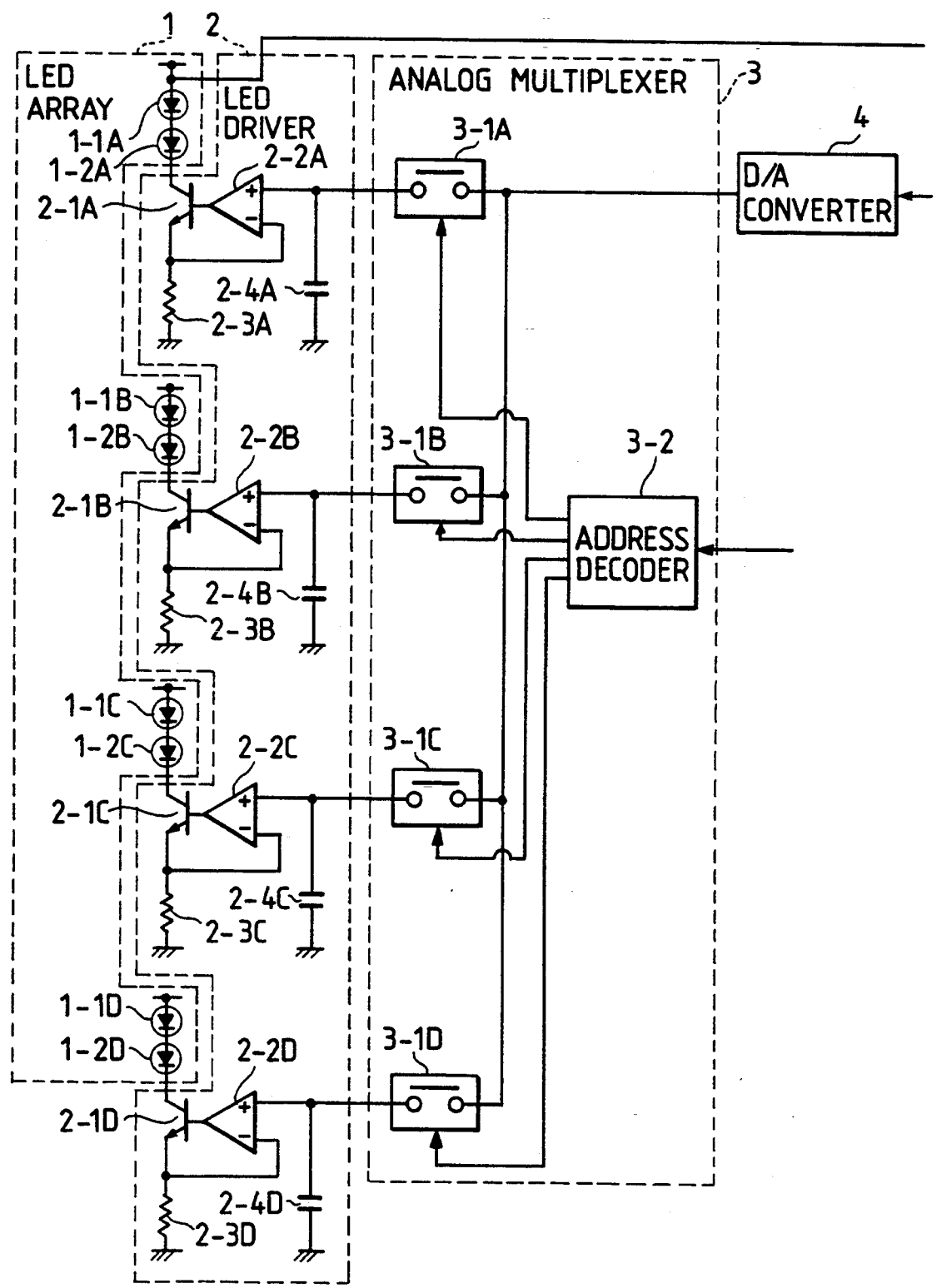
FIG. 2 is a circuit diagram showing the detailed construction of a portion relating to the LED array shown in the embodiment of FIG. 1.

An embodiment according to a first aspect of the present invention will now be described with reference to FIGS. 1 and 2.

An LED array 1 comprising a plurality of LEDs is connected to a microcomputer 10 via an LED driver 2, an analog multiplexer 3 and a D/A converter 4. An address signal is supplied to the analog multiplexer 3 from the microcomputer 10. A CCD-type line sensor 5 is connected to the microcomputer 10 via an amplifying circuit 6 and a binary circuit 7. The output terminal from the amplifying circuit 6 is connected to the microcomputer 10 via a sample-and-hold circuit 8 and an A/D converter 9. A sensor clock pulse and a start pulse are supplied to the line sensor 5 from the microcomputer 10. A sampling pulse is fed to the sample-and-hold circuit 8 from the microcomputer 10. A key matrix 11, a memory 12 and an oscillating circuit 13 are connected to the microcomputer 10, and an infrared LED 15 is also connected to the microcomputer 10 via an infrared LED drive circuit 15. The microcomputer 10 feeds an interrupting signal to an interrupting switch 17. A DC—DC converter 16 feeds the driving power to the line sensor 5, the amplifying circuit 6 and the binary circuit 7. The LED array 1 applies light to the information on an information-recorded medium and the line sensor 5 receives the reflected light from the medium. The memory 12 is controlled by the microcomputer 10 such that the stored information can be updated only by a sensitivity adjusting mode of an optical character reader.

A detailed description will be given of the construction of the LED array 1, the LED driver 2 and the analog multiplexer 3 shown in FIG. 1 with reference to FIG. 2.

First, two LEDs 1-1A and 1-2A are connected in series between the power supply and the ground together with an LED driving transistor 2-1A and a feedback resistor 2-3A. The base of the LED driving transistor 2-1A is connected to the output terminal of a differential amplifier 2-2A. The non-inversion input terminal of the differential amplifier 2-2A is connected to the D/A converter 4 by way of an address selection switch 3-1A, whereas the inversion input terminal thereof is connected to the contact point between the emitter of the LED driving transistor 2-1A and the feedback resistor 2-3A. A smoothing capacitor 2-4A is connected between the non-inversion input terminal of the differential amplifier 2-2A and the ground. An address decoder 3-2 is connected to the microcomputer 10 and the respective address selection switches 3-1A-3-1D, and thus, it receives from the microcomputer 10 an address signal including the information on the on/off timing of the address selection switches 3-1A-3-1D so as to generate a selection signal for controlling on/off of the address selection switches 3-1A-3-1D. The circuit section including the LED driving transistor 2-1A and the differential amplifier 2-2A comprises the voltage-current converting circuit for converting the voltage being fed to the non-inversion input terminal of the differential amplifier 2-2A into the corrector current of the LED driving transistor 2-1A.

The construction of the circuit including the LEDs 1-1A and 1-2A, the LED driving transistor 2-1A, the differential amplifier 2-2A (hereinafter referred to as the circuit A) has been discussed as described above. Such a construction is also applied to the circuit including the LEDs 1-1B and 1-2B, the LED driving transistor 2-1B and the differential amplifier 2-2B (hereinafter referred to as the circuit B), the circuit including the LEDs 1-1C and 1-2C, the LED driving transistor 2-1C and the differential amplifier 2-2C (hereinafter referred to as the circuit C) and the circuit including the LEDs 1-1D and 1-2D, the LED driving transistor 2-1D and the differential amplifier 2-2D (hereinafter referred to as the circuit D). These circuits A-D are placed in parallel to the output terminal of the D/A converter 4.

A description will now be given of the operation of the circuit for adjusting the sensitivity of the optical character reader according to the present embodiment.

A sheet of white paper is used as a reference material to which the sensitivity adjustment of the optical character reader will be made since the optical reflectivity of white paper is uniform over the entire surface. It is first placed in the information reading position. The optical character reader is switched to the sensitivity adjusting mode, thereby transmitting a parallel digital signal to the D/A converter 4 from the microcomputer 10. The parallel digital signal is converted into an analog signal in the D/A converter 4 and further fed to the respective address selection switches 3-1A-3-1D. At the initial stage of the sensitivity adjustment, since a common selection signal is fed to the address selection switches 3-1A-3-1D from the address decoder 3-2, the switches 3-1A-3-1D run the identical on/off operation, thus supplying the same amount of analog signal to the non-inversion input terminal of the respective differential amplifiers 2-2A-2-2D.

Now, an example of the circuit A will be given. After the analog voltage fed to the differential amplifier 2-2A is non-invertingly amplified therein, it is fed to the base of the LED driving transistor 2-1A and further fed in the form of a driving current to the LEDs 1-1A and 1-2A connected to the collector of the LED driving transistor 2-1A. Thus, the LEDs 1-1A and 1-2A emit light at a luminance level in accordance with the amount of the driving current, and consequently, the emitted light applies to the white paper.

The operation of the circuits B, C and D is the same as that of the circuit A. Likewise, the respective LEDs 1-1B-1-1D and 1-2B-1-2D emit light in a manner similar to the LEDs 1-1A and 1-2A and the emitted light applies to the white paper.

As stated above, the circuits A-D are constructed in a similar manner and the analog voltages being input to the respective circuits A-D are equal to each other. Accordingly, the luminances of the respective LEDs 1-1A-1-1D and 1-2A-1-2D should be the same. However, they are not actually equal to each other, thus accordingly varying the amount of light applying to the white paper in accordance with the varied luminance.

The reflected light from the white paper is read in the line sensor 5. A series analog voltage is applied to the output terminal of the line sensor 5 in proportion to the amount of the reflected light from the different portions of the white paper, that is, the amount of the light received by the line sensor 5. The series analog voltage is amplified in the amplifying circuit 6 and fed to the sample-and-hold circuit 8 in which the series analog voltage is sampled and held by a sampling pulse being fed from the microcomputer 10 so that it is converted into a series sampling voltage. Subsequently, the series sampling voltage is converted into a parallel digital signal in the A/D converter 9 and further fed to the microcomputer 10. Then, the microcomputer 10 stores the parallel digital signal in the memory 12. A non-volatile memory such as $E^2PROM$ (Electrically Erasable and Programmable ROM) and a RAM retained by the use of a battery is used as a memory.

The parallel digital signal indicates the corresponding series sampling voltage, that is, the series analog voltage, which further represents the amount of light received by the line sensor 5, in other words, the amount of light emitted from the LEDs 1-1A-1-1D and 1-2A-1-2D to the piece of white paper. Thus, since the amount of light applied to the white paper is in proportion to the luminances of the LEDs 1-1A-1-1D and 1-2A-1-2D, the parallel digital signal is substantially indicative of the variations of the luminances of the LEDs 1-1A-1-1D and 1-2A-1-2D. Consequently, if driving currents of the LEDs 1-1A-1-1D and 1-2A-1-2D are adjusted in accordance with the value of the stored parallel digital signal, the variations in the luminances of the LEDs 1-1A-1-1D and 1-2A-1-2D can be corrected.

The operation of correcting the variations will be explained. After the parallel digital signal is stored in the memory 12, the microcomputer 10 reads the parallel digital signal (hereinafter referred to as a first parallel digital signal), thereby calculating the discrepancy in the amount of light being received in the line sensor 5 depending on the different portions of the line sensor 5 so as to find the levels of luminance of the LEDs 1-1A-1-1D and 1-2A-1-2D corresponding to the different portions of the line sensor 5. Upon determination of the luminances of these LEDs, an instruction for a larger driving current to flow to an LED emitting light at a lower luminance, and on the other hand, for a smaller driving current to flow to an LED with a higher luminance is given to the D/A converter 4 in the form of a parallel digital signal (hereinafter referred to as a second parallel digital signal). At the same time, the parallel digital signal is written to the memory 12 in the form of a current corrected value.

The D/A converter 4 converts the second parallel digital signal into the series analog voltage which is fed to the respective address selection switches 3-1A-3-1D. Since the discrepancy in the levels of luminance depending on the LEDs 1-1A-1-1D and 1-2A-1-2D is corrected in the second parallel digital signal, the series analog voltage varies in accordance with the corrected levels of luminance.

Based on the current corrected value stored in the memory 12, the microcomputer 10 supplies an address signal for successively selecting an address according to the timesharing system to the address selection switches 3-1A-3-1D, thereby controlling the on/off mode of the switches. Now, an example of the circuit A will be given. The timing of supplying a selection signal to the address selection switch 3-1A is controlled such that the input of the selection signal to the address selection switch 3-1A coincides with the output of the series analog voltage indicative of the amount of light applied from the LEDs 1-1A and 1-2A transmitted from the D/A converter 4, thereby transmitting only the voltage indicating the luminance of the LEDs 1-1A and 1-2A of the series analog voltage to the output terminal of the address selection switch 3-1A. Subsequently, after the transmitted voltage is non-invertingly amplified in the differential amplifier 2-2A, it is fed in the form of a driving current to the LEDs 1-1A and 1-2A via the LED driving transistor 2-1A in a manner similar to that of the operation described above. It should be noted that the driving current applied to the LEDs 1-1A and 1-2A is adjusted so as to correct the luminance of the LEDs 1-1A and 1-2A. More specifically, when the luminance of the LEDs 1-1A and 1-2A is higher, the driving current is adjusted to be smaller than the original driving current, whereas when the luminance thereof is lower, the driving current is adjusted to be larger than the original driving current.

The same operation to that of the circuit A is performed in the circuits B, C and D.

The LED array 1 as adjusted in the way described above again applies light to the reference material to which the sensitivity adjustment will be made. The line sensor 5 reads the reflected light from the material. After the output from the line sensor 5 is sampled and held, it is A/D converted so as to generate another first parallel digital signal, which replaces the former first parallel digital signal stored in the memory 12.

Subsequently, the microcomputer 10 reads the updated first parallel digital signal and again calculates the discrepancy between the amounts of reflected light depending on the different portions of the line sensor 5 so as to find the levels of luminance of the LEDs 1-1A-1-1D and 1-2A-1-2D corresponding to the different portions of the line sensor 5. Then, if the microcomputer 10 finds that the levels of luminance are even, the second parallel digital signal stored in the memory 12 is determined so as to complete the sensitivity adjusting mode.

If the microcomputer 10 determines that there are variations in the levels of luminance, an instruction for a larger current to flow to the LED emitting light at lower luminance, and on the other hand, for a smaller current to flow to the LED at higher luminance is fed in the form of a further updated second parallel digital signal to the D/A converter 4. At the same time, the further updated second parallel digital signal is written to the memory 12 in place of the formerly updated second signal. This operation will be repeated until the microcomputer 10 detects no variations in the levels of luminance.

When the sensitivity adjusting mode is completed, the optical character reader starts the normal reading operation. More specifically, the LED array 1 intermittently emits light to the medium and the reflected light from the medium is received by the line sensor 5 from which a series analog signal obtained by the reflected light is extracted. After the series analog signal is amplified in the amplifying circuit 6, it is converted into a binary signal in the binary circuit 7 so as to be fed to the microcomputer 10. Subsequently, the microcomputer 10 decodes the binary signal and supplies the decoded data to the infrared LED 15 via the infrared drive circuit 14, thereby transmitting the data to a signal processing device by infrared light. The key matrix 11 sets the operation mode of the optical character reader and the oscillating circuit 12 generates an operation clock signal. During the normal information reading operation by the optical character reader, the microcomputer 10 controls the driving currents on the basis of a second parallel digital signal (corrected value) stored in the memory 12. Thus, the levels of luminance of the LEDs 1-1A-1-1D and 1-2A-1-2D forming the LED array 1 are equal, and accordingly, light is uniformly applied to the information-recorded medium, thus obtaining a series analog voltage accurately responding to the darkness and brightness of the information.

Figure 3:
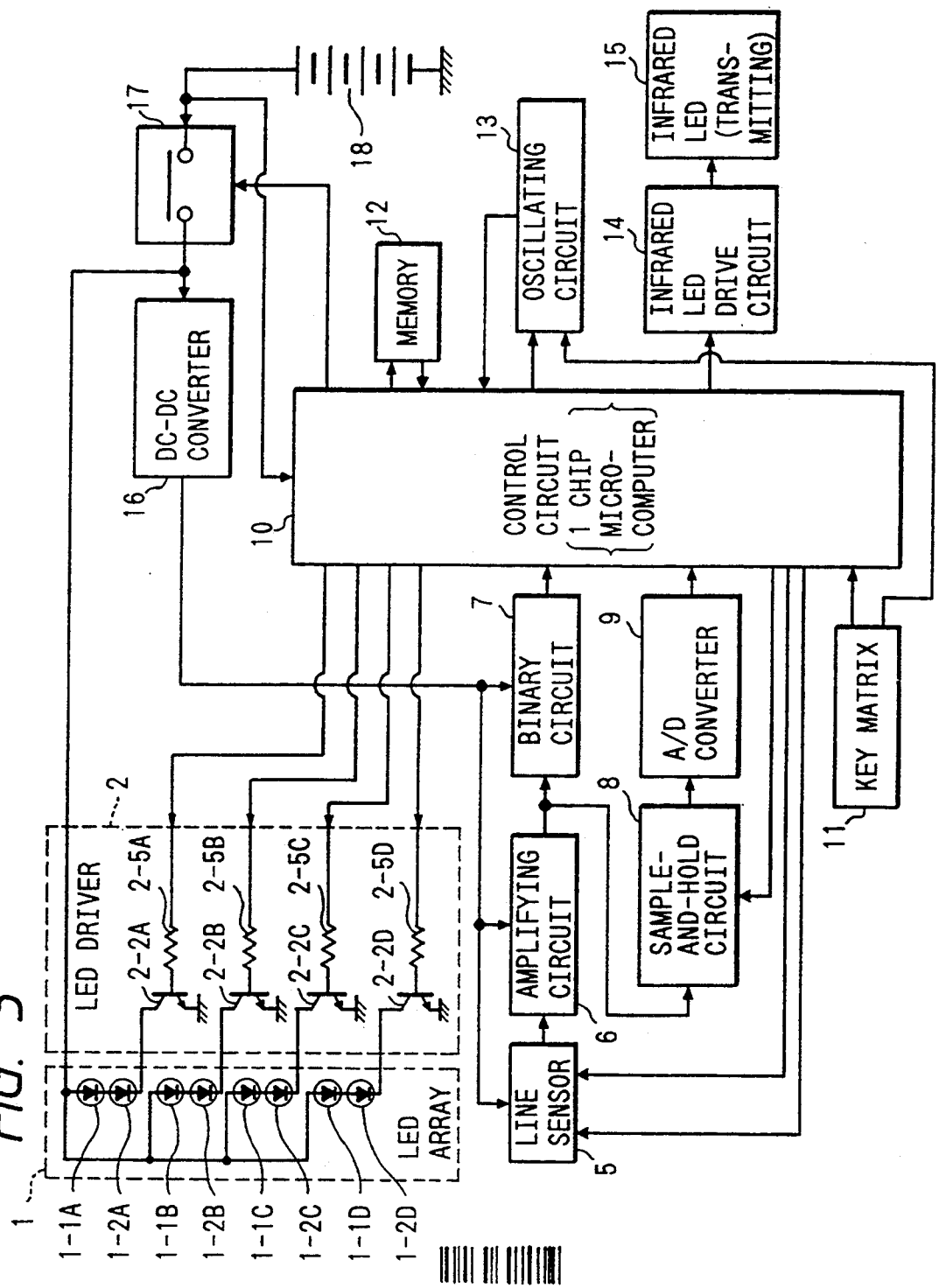
FIG. 3 is a block diagram showing an embodiment of a circuit for adjusting the sensitivity of an optical character reader according to a second aspect of the present invention.

A second aspect of the present invention will now be described with reference to FIG. 3.

The present embodiment differs from the above-described first aspect in that an LED driver 2' instead of the LED driver 2 in the foregoing embodiment comprises the voltage-current converting circuit including the LED driving transistors 2-1A-2-1D and series resistors 2-5A-2-5D, and that the LED driver 2' and the microcomputer 10 are directly connected, thereby omitting the analog multiplexer 3 and the D/A converter 4.

A description will now be given of the operation of the sensitivity adjustment according to the present embodiment. A sheet of white paper is also used as a reference material to which the sensitivity adjustment of the optical character reader will be made. It is first placed in the reading position of the optical character reader. The optical character reader is switched to the sensitivity adjusting mode, thereby transmitting a parallel LED driving voltage from the microcomputer 10. The parallel LED driving voltage is directly applied to the bases of the LED driving transistors 2-1A–2-1D via the series resistors 2-5A–2-5D of the LED driver 2'. Then, the LED driving transistors 2-1A–2-1D convert the LED driving voltage into a current in accordance with the voltage and feeds the driving current to the LEDs 1-1A–1-1D and 1-2A–1-2D connected to the collectors of the transistors 2-1A–2-1D, respectively. Thus, the LEDs 1-1A and 1-2A of the circuit A, the LEDs 1-1B and 1-2B of the circuit B, the LEDs 1-1C and 1-2C of the circuit C and the LEDs 1-1D and 1-2D of the circuit D emit light concurrently so as to apply light to the white paper.

The reflected light from the piece of white paper is read by the line sensor 5. A series analog voltage obtained by reading is amplified in the amplifying circuit 6 and fed to the sample-and-hold circuit 8 in which the series analog voltage is sampled and held so as to be converted into a series sampling voltage. Subsequently, the series sampling voltage is further converted into a parallel digital signal (hereinafter referred to as a first parallel digital signal) in the A/D converter 9 and fed to the microcomputer 10 which stores the first parallel digital signal in the memory 12.

In this embodiment as well as the foregoing embodiment, the first parallel digital signal indicates the variations in the amounts of light emitted from the LEDs 1-1A–1-1D and 1-2A–1-2D.

The microcomputer 10 reads the first parallel digital signal, thereby calculating the discrepancy between the amounts of reflected light depending on the different portions of the line sensor 5. As a result, when such a discrepancy is detectable, the following adjustment will be made. The driving current is applied for a longer time to an LED corresponding to the portion of the line sensor 5 receiving the smaller amount of reflected light, and for a shorter time to an LED corresponding to the portion of the line sensor 5 receiving the greater amount of reflected light. Such a corrected value indicative of the adjusted power applying time is written to the memory 12.

The microcomputer 10 reads the corrected data from the memory 12 so as to generate a parallel LED driving voltage which will be applied in accordance with the power applying time corrected value. The parallel LED driving voltage is supplied to the bases of the LED driving transistors 2-1A–2-1D via the respective series resistors 2-5A–2-5D. The applying time of the parallel LED driving voltage corresponds to the power applying time corrected value, and more specifically, corresponds to the amounts of light depending on the variations in the luminances of the LEDs 1-1A–1-1D and 1-2A and 1-2D. Consequently, the applying time of the parallel LED driving voltage is set so as to vary according to the variations in the luminances of the LEDs 1-1A–1-1D and 1-2A and 1-2D.

An example of the circuit A will be given in order to specifically explain the foregoing description. When a greater amount of light is applied from the LEDs 1-1A and 1-2A of the circuit A, the luminance of the these LEDs is higher than those of the other LEDs. Thus, in order to decrease the amount of light applied to the white paper from the LEDs 1-1A and 1-2A, the applying time of the parallel LED driving voltage to the LED driving transistor 2-1A is corrected to be shorter so that the applying time of the driving current to the LEDs 1-1A and 1-2A is shorter than that to the other LEDs. Conversely, when the luminance of the LEDs 1-1A and 1-2A is lower than those of the other LEDs, the applying time of the parallel LED driving voltage to the LED driving transistor 2-1A is corrected to be longer so that the applying time of the driving current to the LEDs 1-1A and 1-2A is longer than that to the other LEDs.

The same correcting operation as that of the circuit A is performed in the circuits B, C and D.

The LED array 1 as adjusted in the way described above again applies light to the reference material to which the sensitivity adjustment will be made. The line sensor 5 reads the reflected light from the material. After the output from the line sensor 5 is sampled and held, it is A/D converted so as to generate another first parallel digital signal, which replaces the former first parallel digital signal stored in the memory 12.

Subsequently, the microcomputer 10 reads the updated first parallel digital signal and again calculates the discrepancy between the amounts of reflected light depending on the different portions of the line sensor 5 so as to find the applying time of the driving current to the respective LEDs 1-1A–1-1D and 1-2A–1-2D in accordance with such a discrepancy. If the microcomputer 10 determines that there is no discrepancy between the amounts of reflected light, the power applying time corrected value stored in the memory 12 is established so as to complete the sensitivity adjusting mode.

If the microcomputer 10 determines that there are variations in the amounts of reflected light, the applying time of the driving current to the respective LEDs 1-1A–1-1D and 1-2A–1-2D is corrected. At the same time, the further updated power applying time corrected value is written to the memory 12 in place of the formerly updated corrected value. Then, the reference material is read again on the basis of the further updated corrected value. This correcting operation will be repeated until the microcomputer 10 determines that there are no variations in the amounts of reflected light. After the sensitivity adjustment is over, the optical character reader starts a normal information reading operation. During this operation, the amounts of light from the LEDs 1-1A–1-1D and 1-2A–1-2D forming the LED array 1 are adjusted, and accordingly, as described in the foregoing embodiment, light is uniformly applied to the information-recorded medium, thus obtaining a series analog voltage accurately responding to the darkness and brightness of the information.

During the operation of the sensitivity adjustment, it is sufficient that a series analog voltage is sampled discretely in the sample-and-hold circuit 8, thus enabling the use of a low-speed A/D converter built in a microcomputer, or the like, and further making the design of the whole device easier.

The construction of the LED array is not limited to the present embodiments; but instead, it may be modified such that a larger number of LEDs or a larger number of LED groups comprising a plurality of LEDs may be used.

In the foregoing embodiments, the amounts of light applied by the LED array 1 are adjusted to be uniform; but instead, in response to a demand for an optical system such as an optical character reader, it may be modified to deliberately cause a predetermined discrepancy between the amount of light applied by the central portion of the LED array 1 and that by the peripheral portion thereof.

In order to overcome the drawback in that the luminance of an LED is inclined to vary depending on temperature or lapse of time, certain arrangements such as a temperature monitoring function and a usage-time counter may be provided, and a function may be further added such as one for instructing a user to operate the foregoing sensitivity adjustment in excess of a predetermined temperature or period. Thus, an optical character reader constantly adjusted to have good reading sensitivity can be obtained.

Not only an LED array but also a light source comprising a plurality of light emitting materials such as lamps are applicable to the present invention as the light source applying light to an information-recorded medium.

Further, the foregoing two embodiments may be applied to one optical character reader at the same time.

As will be clearly understood from the foregoing description, the present invention offers the following advantages.

At the initial stage, the optical character reader reads the reference material to which sensitivity adjustment is made and calculates the discrepancy between the amounts of light due to variations in the luminances of a plurality of LEDs forming an LED array, thereby automatically adjusting the amounts of light applied by the LEDs so as to correct such a discrepancy. Hence, it is not necessary to select the LEDs in forming the LED array, and thus, the number of processes in assembling the optical character reader can be reduced.

Moreover, although the amount of light applied by the LEDs varies due to temperature or lapse of time, such variations can be extremely easily adjusted by reading the reference material.

What is claimed is:

1. A circuit for adjusting the sensitivity of an optical character reader feeding light emitted from a light source formed of a plurality of light emitting materials to an information-recorded medium in which information is optically recorded; said optical character reader reading said information by sensing the reflected light from said information-recorded medium by a line sensor; said circuit comprising:

means for starting to adjust sensitivity by operating said light source and said line sensor in order to read a reference material to which sensitivity adjustment is made, said reference material having uniform optical reflectivity on the surface, so that said light source emits light and said line sensor reads the reflected light from the surface of said reference material;

analog-digital converting means for converting an analog signal from said line sensor into a digital signal;

means for determining the amount of light by determining the discrepancy between the amounts of light depending on the different portions of said line sensor by said digital signal from said analog-digital converting means;

means for creating a current corrected value indicative of a driving current flowing to each said light emitting material based upon determination of the amount of light-determination means in order to adjust the amount of light emitted from each said light emitting material forming said light source in accordance with said discrepancy between the amounts of light depending on the different portions of said line sensor;

memory means for storing said current corrected value; and means for adjusting a driving current flowing to each said light emitting material; said means calling said current corrected value from said memory means so as to feed said current being corrected on the basis of said current corrected value to each said light emitting material.

2. A circuit according to claim 1, said means for adjusting a driving current flowing to each said light emitting material comprising first means for generating a driving current flowing to each said light emitting material, said driving current being corrected flowing to each said light emitting material on the basis of said driving current corrected value stored in said memory means; and second means for selectively feeding a driving current to said light emitting material, said driving current being corrected on the basis of said driving current corrected value stored in said memory means.

3. A method of adjusting the sensitivity of an optical character reader feeding light emitted from a light source formed of a plurality of light emitting materials to an information-recorded medium in which information is optically recorded; said optical character reader reading said information by sensing the reflected light from said information-recorded medium by a line sensor; said method comprising the steps of:

(a) emitting light from said light source in order to apply light to a reference material to which sensitivity adjustment is made, said reference material having uniform optical reflectivity;

(b) reading the reflected light from the surface of said reference material by said line sensor;

(c) converting an output signal from said line sensor into a digital signal;

(d) determining the discrepancy between the amounts of light depending on the different portions of said line sensor by said digital signal;

(e) creating a current corrected value indicative of a driving current flowing to each said light emitting material based upon determination in (d) so that the amount of light emitted from each said light emitting material can be adjusted in accordance with said discrepancy;

(f) creating a corrected current flowing to each said light emitting material on the basis of said current corrected value; and (g) feeding the created current to each said light emitting material.

4. A circuit for adjusting the sensitivity of an optical character reader feeding light emitted from a light source formed of a plurality of light emitting materials to an information-recorded medium in which information is optically recorded; said optical character reader reading said information by sensing the reflected light from said information-recorded medium by a line sensor; said circuit comprising:

means for starting to adjust sensitivity by operating said light source and said line sensor in order to read a reference material to which sensitivity adjustment is made, said reference material having uniform optical reflectivity on the surface, so that said light source emits light and said line sensor reads the reflected light from the surface of said reference material;

analog-digital converting means for converting an analog signal from said line sensor into a digital signal;

means for determining the amount of light by determining the discrepancy between the amounts of light depending on the different portions of said line sensor by said digital signal from said analog-digital converting means;

means for creating a current-applying time corrected value indicative of the applying time of a driving current to each said light emitting material based upon determination of the amount of light-determination means in order to adjust the amount of light emitted from each said light emitting material forming said light source in accordance with said discrepancy between the amounts of light depending on the different portions of said line sensor;

memory means for storing said current-applying time corrected value; and means for adjusting the light-emitting time by said light emitting materials; said means calling said current-applying time corrected value from said memory means so as to adjust said applying time of said driving current to said light emitting materials on the basis of said corrected value.

5. A circuit according to claim 4, said line sensor comprising a photoelectric conversion section including a plurality of photodiodes; a charge storage section including PN junction sections of said respective photodiodes; and a charge transfer section including CCDs (Charge Coupled Devices) the number of which accords with the number of said photodiodes, wherein said line sensor is a CCD line sensor in which the charges are stored in accordance with the amount of light.

6. A method of adjusting the sensitivity of an optical character reader feeding light emitted from a light source formed of a plurality of light emitting materials to an information-recorded medium in which information is optically recorded; said optical character reader reading said information by sensing the reflected light from said information-recorded medium by a line sensor; said method comprising the steps of:

(a) emitting light from said light source in order to apply light to a reference material to which sensitivity adjustment is made, said reference material having uniform optical reflectivity;

(b) reading the reflected light from the surface of said reference material by said line sensor;

(c) converting an output signal from said line sensor into a digital signal;

(d) determining the discrepancy between the amounts of light depending on the different portions of said line sensor by said digital signal;

(e) creating a current-applying time corrected value indicative of the applying time of a driving current to each said light emitting material based upon determination in (d) so that the amount of light emitted from each said light emitting material can be adjusted in accordance with said discrepancy; and (f) controlling the applying time of a driving current to each said light emitting material on the basis of said corrected value.

* * * * *